No. 730,162. Patented June 2, 1903.

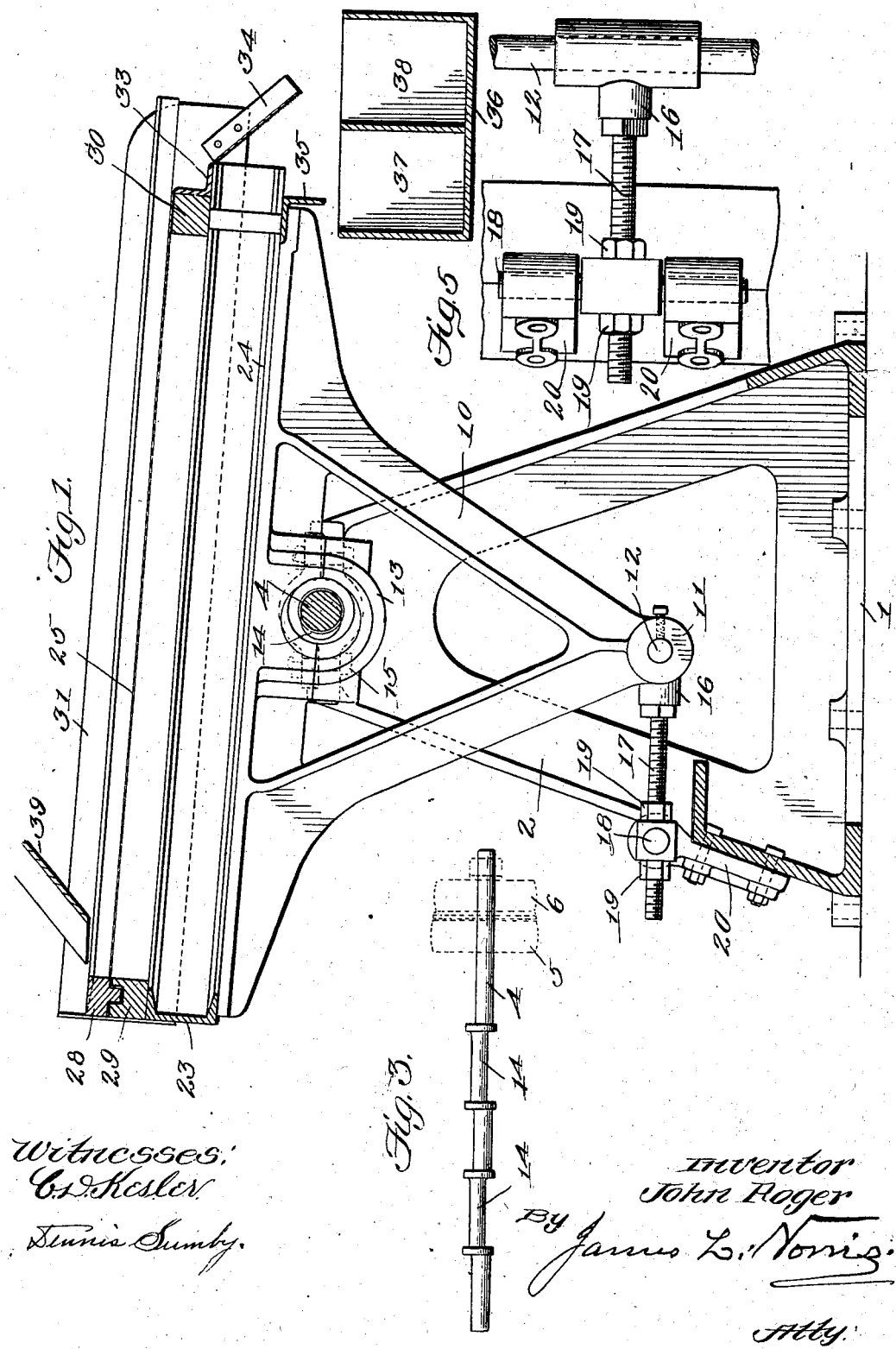

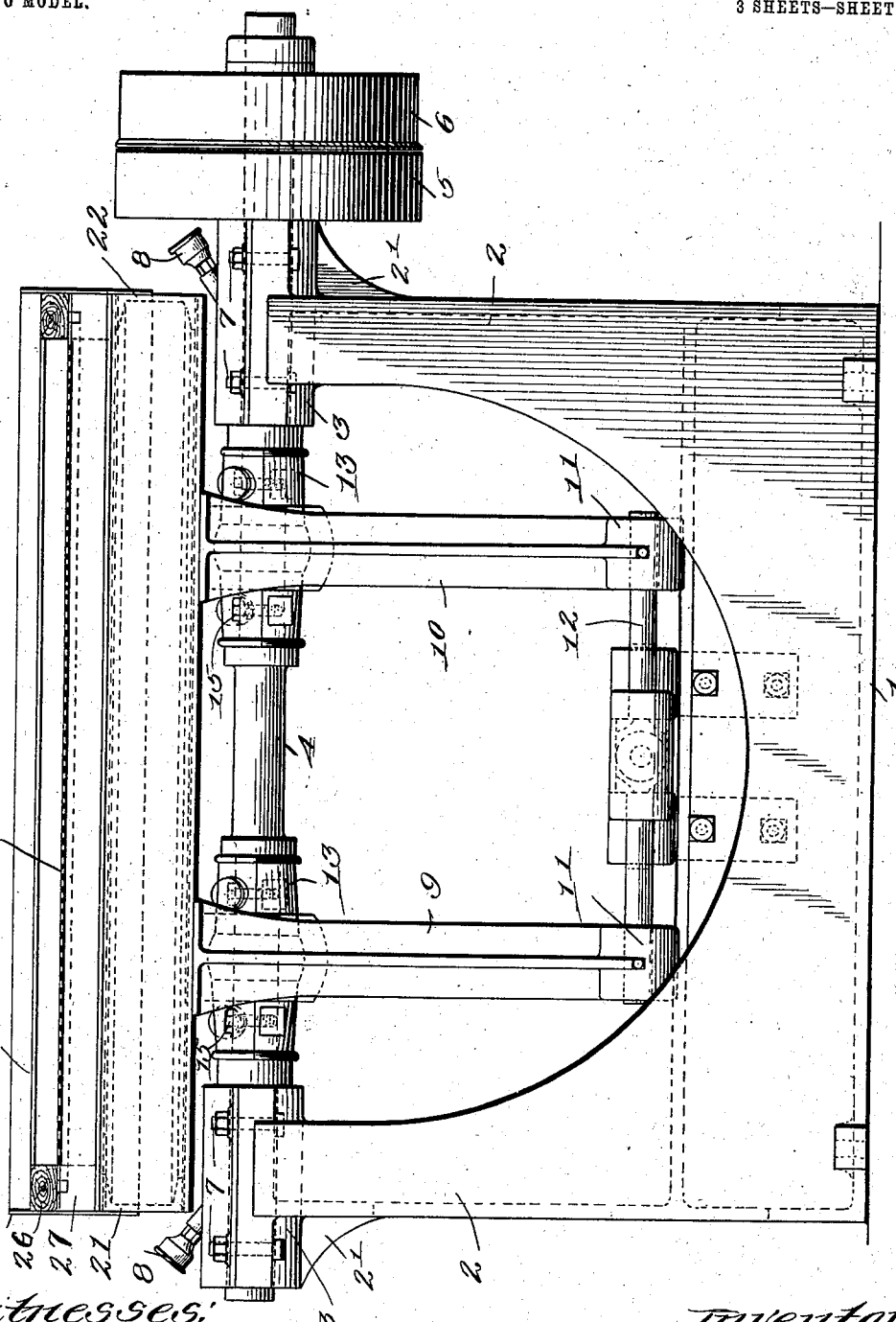

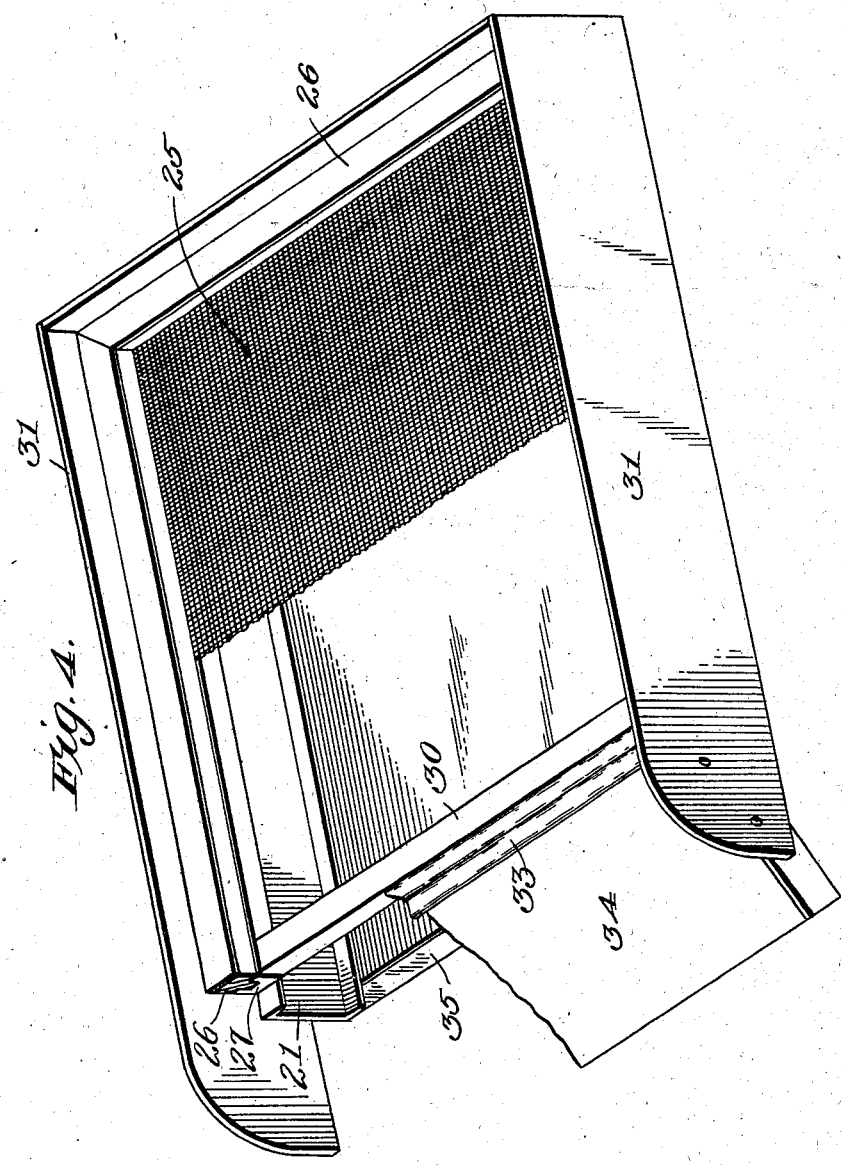

UNITED STATES PATENT OFFICE.

JOHN ROGER, OF DENVER, COLORADO.

SEPARATOR.

SPECIFICATION forming part of Letters Patent No. 730,162, dated June 2, 1903.

Application filed November 13, 1901. Serial No. 82,152. (No model.)

*To all whom it may concern:*

Be it known that I, JOHN ROGER, a subject of the King of Great Britain, residing at Denver, in the county of Arapahoe and State of Colorado, have invented new and useful Improvements in Separators, of which the following is a specification.

This invention relates to certain new and useful improvements in separators, and it is particularly adapted for the separation of various kinds of materials, such as ore or the like.

The invention aims to construct a separator or what may be termed a "vibrating" screen for separating or screening various kinds of materials by a vibratory motion.

The separating or screening of material, particularly through fine screens, is somewhat a vexed problem, and for such purpose the employment of circular screens have been almost exclusively used. The objection to their use is that they are large, cumbersome, and inaccessible and have usually been operated to give to the material a bumping motion to cause the fine material to pass through the screen-openings, and owing to this bumping action the material would travel forward readily and the particles which are just large enough to fit in the screen-openings usually are forced tightly therein, causing thereby the choking up of the screen. Therefore this invention aims to overcome the foregoing objections by constructing a separator or vibrating screen which is operated in such a manner that on every revolution of the drive-shaft the material upon the screen will be thrown slightly off the same and forward and allow the material to fall as the screen makes its back stroke. By such an arrangement the material is advanced by a series of impulses instead of by a direct rubbing contact with the screen-surface, thereby greatly decreasing the wear on the screen plate or cloth and also tending to keep the screen-openings free during the passage therethrough of the material.

The invention further aims to construct a separator or vibrating screen which shall be simple in its construction, strong, durable, efficient in its operation, comparatively inexpensive to set up; and to this end it consists of the novel combination and arrangement of parts hereinafter more specifically described, illustrated in the accompanying drawings, and particularly pointed out in the claims hereunto appended.

In describing the invention in detail reference is had to the accompanying drawings, wherein like numerals of reference indicate corresponding parts throughout the several views, and in which—

Figure 1 is a central vertical section of my improved separator or screen, and Fig. 2 is an end elevation. Fig. 3 is a detail view of the operating-shaft and its eccentrics. Fig. 4 is a perspective view of the screen-frame, partly broken away. Fig. 5 is a plan of the mechanism for adjusting the screen to various inclinations.

Referring to the drawings by reference-numerals, the supporting or main frame is formed with a base 1, having integral therewith at each end thereof a vertical standard 2, provided with an outwardly-extending offset 2'. Each of the standards 2 at the top thereof is provided with a journal-box 3, in which is journaled the drive-shaft 4, extending across the main frame. The latter is constructed, preferably, of cast metal, although other material may be employed, as well as other forms than that above referred to. The drive-shaft 4 extends from one side of the frame and carries the fast and loose pulleys 5 6, respectively, which are suitably connected to a power source.

The reference-numeral 7 denotes the bolts or other means for securing the sections of the journal-boxes 3 together. These bolts may extend in any suitable manner through the sections of the box.

The reference-numeral 8 denotes a lubricating device mounted upon the journal-boxes 3.

Adapted to be arranged within the main frame, as well as operating between the standards 2, is a pair of substantially V-shaped supports 9 10, which are closed at their top and provided at their lower end with a bearing 11 to receive the shaft 12, the latter connecting the supports 9 10 together, thereby forming the vibratory frame for supporting and operating the screen-frame. Centrally of the top of each of the supports 9 10 is formed an eccentric-box 13, in which is journaled the eccentrics 14, carried by the shaft 4. The reference-numeral 15 denotes the bolts or other means for connecting together the sections of the eccentric-boxes. These bolts may extend through and be secured to the sections in any suitable manner.

The shaft 12 carries a forwardly-projecting interiorly-screw-threaded coupling 16, secured thereto approximately centrally thereof and is adapted to receive one end of an adjusting-bar 17. This adjusting-bar is screw-threaded and extends through a rock-shaft 18, and, further, carries the fastening-nuts 19, one on each side of the shaft 18. The rock-shaft is journaled in a bearing-bracket 20, secured to the base 1 of the main frame in any desirable manner. The bar 17 is adapted to adjust the vibratory frame to any desired angle, causing thereby the adjustment of the screen, to be hereinafter described.

The reference-numerals 21 22 denote a pair of longitudinally-extending channel-bars, and the reference-numeral 23 a horizontally-extending channel-bar, which is connected in any desirable manner to the forward end of the channel-bars 21 22. The channel-bars are attached to the plate 24, the latter being secured to the supports 9 10 and forms the bottom of the screen-frame.

Mounted upon and secured to the channel-bars 21 22 23 is the frame carrying a screen plate or cloth 25. This frame is formed of two pairs of longitudinally-extending side bars 26 27, a pair of horizontally-extending front bars 28 29, which are secured to the forward ends of the bars 26 and 27, and a longitudinally-extending bar 30, secured to the rear end of the bars 26 27. The screen plate or cloth 25 is secured between the sides and front bars 26 27 28 29 and upon the rear bar 30.

The reference-numerals 31 32 denote the sides and front plates, respectively, of the screen-frame. The former are secured to the side bars 26 27 and project above as well as rearwardly therefrom, and the latter is secured to the front bars 28 29 and project above the same.

Mounted upon and secured to the channel-bars 21 22 and also to the rear bar 31 is an angle-iron 33, and against the lower portion of said angle-iron 33 is placed the top edge of an inclined delivery-chute 34, the latter being secured to the side plates 31 and also to the angle-iron 33.

The reference-numeral 35 denotes an angle-iron secured to one end of the supports 9 10 to prevent the screenings from falling within the housing or frame as they leave the bottom plate 24.

Arranged at the rear of the screen-frame is a receptacle 36, divided into two compartments 37 38, the former to receive the screenings from the bottom plate 24 and the latter to receive the separated material from the screen plate or cloth through the medium of the delivery-chute 34, which is so arranged as to extend over the compartment 38.

The reference-numeral 39 denotes a supply-chute arranged above the screen-frame at the forward end thereof.

The operation of the separator is as follows: It will be evident that on the shaft being rotated through the medium of the fixed pulley the eccentrics upon the shaft will impart to the supports 9 10 and screen a vibrating motion due to the eccentricity of the eccentrics and their boxes, the screen in the meanwhile being adjusted to the angle desired, depending on the kind of material to be separated. The material to be separated or screened is fed to the surface of the screen plate or cloth through the medium of the chute 39, and the movement of the screen causes the material to travel toward the other end thereof, the fine material passing through the perforations in the screen plate or cloth and dropping onto the bottom plate 24. This fine or separated material will also travel forward with the movement of the screen until it reaches the end of the bottom plate, where it will pass directly into the receptacle 36. The coarse material similarly passes over the surface of the screen plate or cloth, and by means of the chute 34 it will pass into the compartment 38 of the receptacle 36. It will be evident that when the shaft is operated, the vibratory motion given to the supports 9 10, and the screen the material will be thrown slightly off the screen and forward and that the same will fall upon the screen on the back stroke thereof. By such an operation the material is advanced by a series of impulses instead of by a direct rubbing contact with the screen plate or cloth, greatly decreasing the wear on the same as well as tending to keep the screen-openings free from the material, so the operation of separating or screening will not be retarded in any manner. It will also be evident that through the medium of the adjusting-bar 17 and the shafts 12 and 18 the supports 9 10 and the screen-frame can be adjusted to any desirable inclination.

It is thought that the many advantages derived from the separator or vibrating screen constructed in accordance with the foregoing specification, taken in connection with the accompanying drawings, will be readily understood, and it will also be noted that minor changes may be made in the details of construction without departing from the general spirit of my invention.

Having thus fully described my invention, what I claim as new, and desire to secure by Letters Patent, is—

1. In a separator, a main frame, a pair of supports, a shaft connecting the said supports together, a drive-shaft journaled in the said main frame and supports and adapted to support, operate and suspend the latter in the main frame, a screen carried by the said supports, and means connected with the said supports for adjusting them to various inclinations.

2. In a separator, a main frame, a pair of supports, a shaft journaled in the lower ends thereof for connecting the supports together, means connected to the shaft to permit of adjusting the supports to various inclinations, means journaled in said main frame and connected with said supports for suspending, supporting and operating said supports in a vibratory manner, and a screen carried by the said supports.

3. In a separator, a main frame, a vibratory frame, means for suspending the vibratory frame within the main frame and operating the said vibratory frame, a plate secured to the vibratory frame, a pair of longitudinally-extending channel-irons and a transversely-extending channel-iron suitably secured to said plate, two pairs of longitudinally-extending side bars secured to the longitudinally-extending channel-irons, a pair of transversely-extending front bars secured to the said irons, a rear bar secured to the said irons, a screen-plate secured between the said side and front bars and upon the said rear bar, side and front plates for the said bars, and a delivery-chute connected to the side plates.

4. In a separator, a main frame provided with a pair of journal-boxes, a vibratory frame provided with eccentric-boxes, a drive-shaft mounted in the boxes of the main frame and provided with eccentrics journaled in the boxes of the vibratory frame, said shaft adapted to suspend, support and operate the vibratory frame within the main frame, means connected to the main frame and to the vibratory frame for adjusting the latter to various inclinations, and a screen suitably connected to the said vibratory frame.

5. In a separator, a vibratory frame consisting of a pair of supports, a drive-shaft for suspending said vibratory frame and for operating the said vibratory frame, a screen-frame connected to the said supports and consisting of a bottom plate, a channel-iron secured upon said plate at the front thereof, a channel-iron secured upon said plate at each side thereof, side, front and rear bars connected to the channel-irons, a screen-plate secured between the side and front bars and upon the rear bar, and side and front plates secured to the front and side bars, substantially as described.

6. In a separator, a main frame, a vibratory frame carrying a screen suspended within the said main frame, means journaled in the main frame and engaging with the vibratory frame for suspending, supporting and operating the vibratory frame in said main frame, a rock-shaft supported by the main frame, a bar connected at one end with the said vibratory frame and at its opposite end extending through the rock-shaft and adapted to adjust the vibratory frame to various inclinations, and means carried by the bar for securing it in its adjusted position.

7. In a separator, a main frame, a vibratory frame consisting of a pair of supports provided with eccentric-boxes, a drive-shaft having eccentrics journaled in the said boxes of the vibratory frame for operating the said vibratory frame in a vibratory manner, said shaft journaled in said main frame for suspending the said vibratory frame, a screen carried by the said supports and consisting of a bottom plate, a series of channel-irons connected thereto, side, front and rear bars connected to the channel-irons, a screen-plate secured between the side and front bars and upon the rear bar and side and front plates secured to the front and side bars, an angle-iron connected to the rear bar, an angle-iron mounted upon the vibratory frame, a delivery-chute connected to the side plates, and means connected with the main frame and with the vibratory frame for adjusting the latter to various inclinations.

In testimony whereof I have hereunto set my hand in presence of two subscribing witnesses.

JOHN ROGER.

Witnesses:
N. HADFIELD,
JAMES HENDERSON.